H. R. DAVIDSON.
TIRE FOR MOTOR VEHICLE WHEELS.
APPLICATION FILED NOV. 19, 1917.
1,267,985.
Patented May 28, 1918.
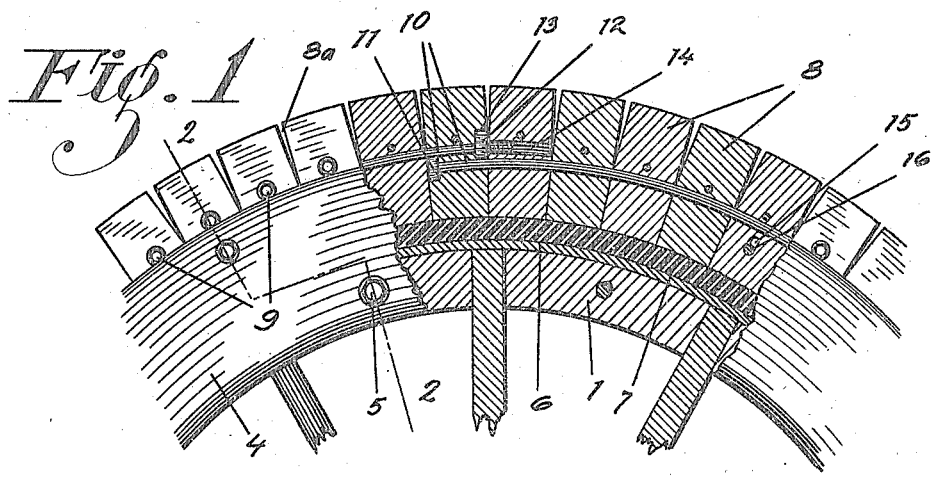
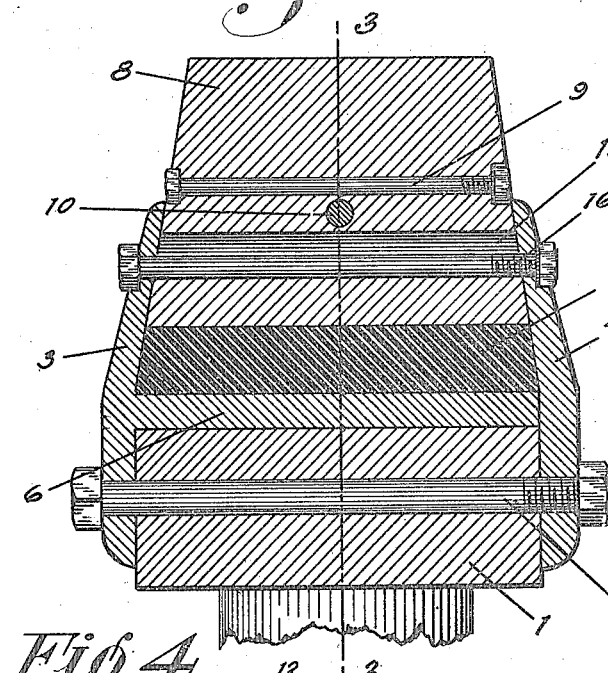
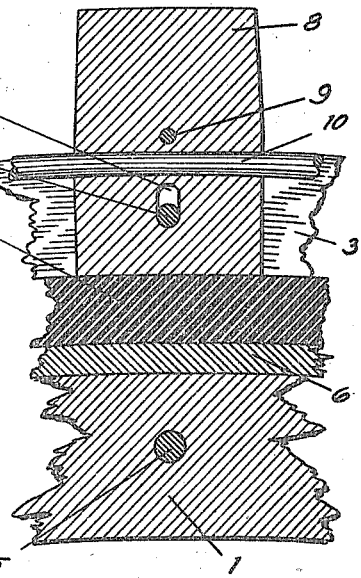
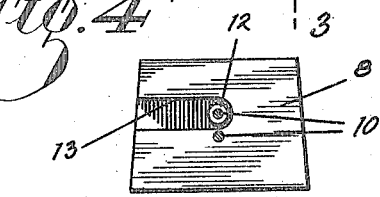
INVENTOR.
Harold R. Davidson
BY
S. Webster
ATTORNEY.

UNITED STATES PATENT OFFICE.

HAROLD R. DAVIDSON, OF OAKDALE, CALIFORNIA.

TIRE FOR MOTOR-VEHICLE WHEELS.

1,267,985. Specification of Letters Patent. Patented May 28, 1918.

Application filed November 19, 1917. Serial No. 202,714.

*To all whom it may concern:*

Be it known that I, HAROLD R. DAVIDSON, a citizen of the United States, residing at Oakdale, in the county of Stanislaus, State of California, have invented certain new and useful Improvements in Tires for Motor-Vehicle Wheels; and I do declare the following to be a full, clear, and exact description of the same, reference being had to the accompanying drawings, and to the characters of reference marked thereon, which form a part of this application.

This invention relates to improvements in the wearing tires of motor vehicles and is particularly designed as a tire for use on trucks and other heavy vehicles.

The object of the invention is to produce a tread surface for the tires which will have a certain amount of resiliency and at the same time be extremely durable.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

In the drawings, similar characters of reference indicate corresponding parts in the several views.

Figure 1 is a side elevation, partly broken out and in section, of a portion of my improved tire as it appears when mounted on the wheel.

Fig. 2 is a sectional view taken on a line 2—2 of Fig. 1.

Fig. 3 is a sectional view taken on a line 3—3 of Fig. 2.

Fig. 4 is a detached view of one of the tread sections showing the means for gaining access to the tightening bolt.

Referring now more particularly to the characters of reference on the drawings, the numeral 1 indicates the felly of the wheel.

My invention provides a receiving channel fixed to the felly 1 and comprising two side plates 3 and 4 secured to the felly by means of bolts 5. If desired, one of the side plates 3 may have an inwardly projecting rim 6 fitting over the felly 1 and abutting against the opposite plate 4. Around the rim 6 and between the plates 3 and 4, I provide a rubber cushion rim 7.

The wear portion of the tread is designed to be mounted around this cushioning rim 7 and consists of a plurality of tread sections 8. These tread sections are made up of wood suitably treated to make them wear resisting and durable, or, if not made of wood, they may be made up of other suitable and durable material which may be found adaptable for the purpose.

Each section is provided with a transverse reinforcing bolt 9 to prevent lateral splitting of the sections. The sections are all bound together in successive order by means of an annular resilient cable 10 having a head 11 by means of which it is held against movement at one end. This cable 10 extends through all the sections 8 to bind them together and terminates in the opposite side of the same block in which it starts where it is provided with a nut 12. The block in which the nut 12 is located is provided with a transverse slot 13 for giving access to the nut 12 to allow the same to be threaded upon the cable 10 to tighten the same to bind all the sections 8 firmly together. Any excess length of the said cable 10, occasioned by advancing the nut 12, is allowed to project into a slot 14 in the next succeeding section 8.

At intervals, some of the sections 8 are provided with elongated slots 15 through which extend bolts 16, which bolts also extend through the plates 3 and 4. These bolts prevent the tread sections from, by any chance, jumping from between the plates 3 and 4. The resilient cable 10 and these slots 15 permit of the tread sections cushioning in against the rubber rim 7 to give the same a certain amount of resiliency when in use. The sections 8 are made of cheaper material than rubber and are more durable and will therefore be more inexpensive than the use of solid rubber treads. They may be easily removed and replaced when worn merely by removing the nut 12 and the bolts 16.

In practice, the outer ends of the sections 8 are spaced slightly apart as at $8^a$. This both permits the resilient action of the sections and at the same time forms an efficient non-skid structure. Furthermore, the wood itself has a lesser tendency to skid than rubber. Further, as the wood splinters and mats in these spaces, it increases the wearing resistance of the blocks.

From the foregoing description it will be readily seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claim.

Having thus described my invention, what I claim as new and useful and desire to secure by Letters Patent is:—

A wheel tread comprising a plurality of tread sections, one section having a side slot and an adjacent section having an orifice extending at right angles to the side slot, a cable extending through all the blocks, a nut threaded on the end of the cable within the side slot, the excess length of the cable occasioned by the advancement of the nut upon the threaded end being free to move through the orifice.

In testimony whereof I affix my signature in presence of a witness.

HAROLD R. DAVIDSON.

Witness:
VERADINE WARNER.

Copies of this patent may be obtained for five cents each, by addressing the "Commissioner of Patents, Washington, D. C."